March 11, 1941. S. F. KARST ET AL 2,234,257
BRAKE
Filed Dec. 27, 1938 3 Sheets-Sheet 1

Inventors:
Sylvester F. Karst
Florian F. Manor

Inventors:
Sylvester F. Karst
Florian F. Manor

March 11, 1941. S. F. KARST ET AL 2,234,257
BRAKE
Filed Dec. 27, 1938 3 Sheets-Sheet 3
Fig. 3.
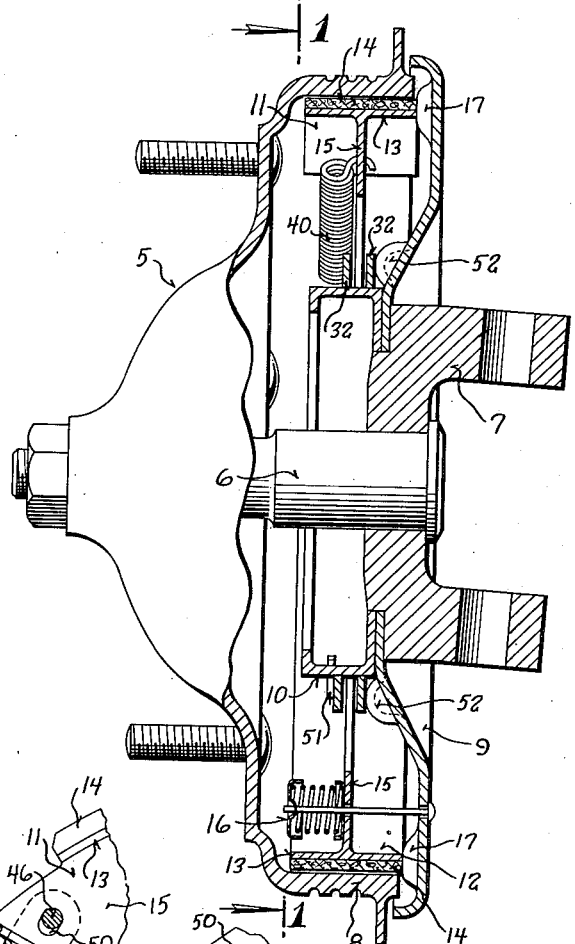
Fig. 6.
Fig. 7.
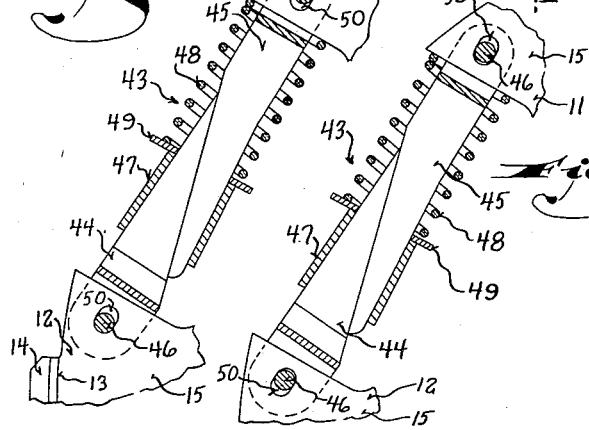
Inventors:
Sylvester F. Karst
Florian F. Manor
By Hutton Jones
Attorney Patented Mar. 11, 1941

2,234,257

UNITED STATES PATENT OFFICE 2,234,257

BRAKE

Sylvester F. Karst and Florian F. Manor, Oshkosh, Wis., assignors of one-third to Thomas W. Meiklejohn, Fond du Lac, Wis.

Application December 27, 1938, Serial No. 247,892

11 Claims. (Cl. 188—78)

This invention relates to brakes, and refers particularly to automobile brakes.

Automobile brakes are now substantially always of the internal expansion type in which a plurality of brake shoes are arranged to be expanded or moved outwardly into braking engagement with the inner cylindrical face of the revolving brake drum. The actual expansion of the brake shoes into engagement with the brake drum may be effected either mechanically or hydraulically.

In all instances, however, the construction of the brakes has been such in the past that the brake lining would wear unevenly, not only with respect to different portions of the same shoe, but the primary shoe would have its lining completely worn before the lining on the secondary shoe showed any real wear.

This uneven wear of the brake lining prevalent in brakes heretofore in use was brought about by the fact that only the primary shoe had a wrapping action during forward travel of the vehicle while the secondary shoe had a wrapping action only during backward travel of the vehicle.

The present invention, therefore, has as one of its objects to provide a brake so constructed that both primary and secondary shoes have a wrapping action at all times thus assuring uniform wear of the brake lining, not only as to all portions of each shoe, but on both shoes alike.

Another object of this invention is to provide a brake wherein proper clearance between the lining and the drum is maintained automatically as the lining wears so as to entirely obviate the need for adjustments of any character.

Another object of this invention is to provide means for automatically taking up any wear which may occur in the actuating mechanism of the brake so that there will be no play nor loose fitting parts with their consequent rattling and unsatisfactory braking action.

Still another object of this invention is to provide an improved brake of the character described whereby the advantages stated are obtained without deviating from the general accepted design of brakes of this character so that the incorporation of these improvements can be effected with little or no additional cost and without altering the present methods of manufacturing such brakes.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 3 is a vertical cross sectional view taken through Figure 1 on the plane of the line 3—3;

Figures 6 and 7 are diagrammatic views of this same mechanism, illustrating its manner of operation.

Figure 1:
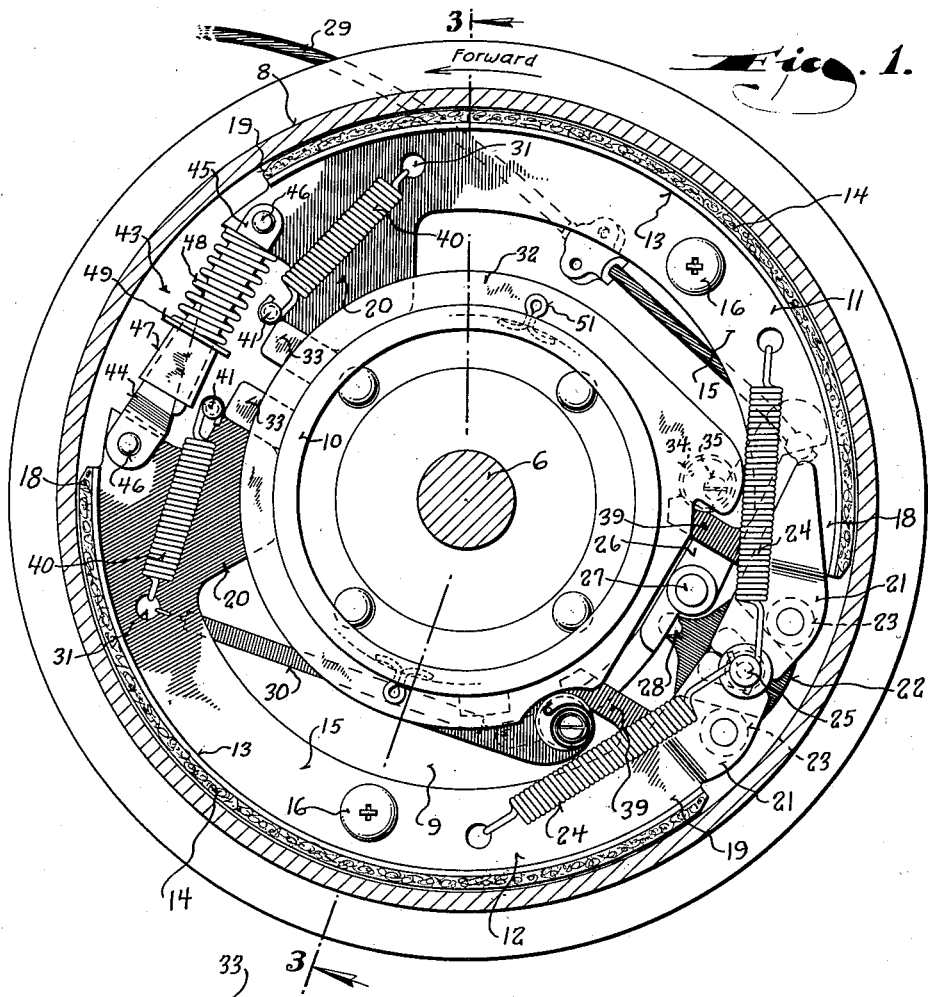
Figure 1 is a vertical sectional view through a brake embodying this invention, said view being taken on the plane of the line 1—1 of Figure 3, and illustrating the left front wheel of an automobile.
Figure 4:
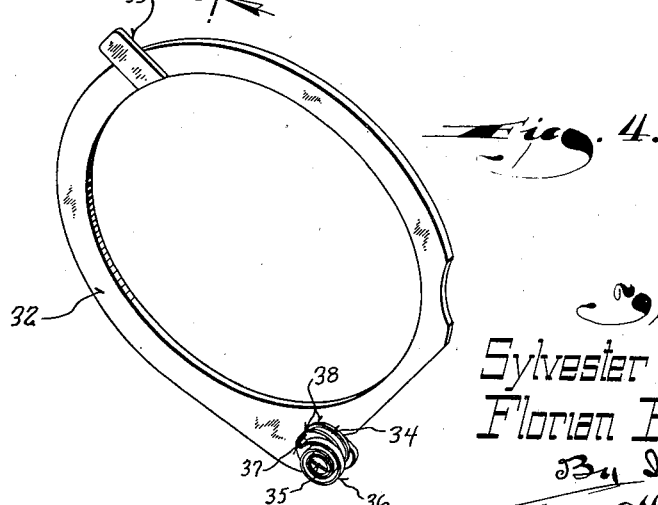
Figure 4 is a perspective view of one of the brake shoe actuating elements.
Figure 2:
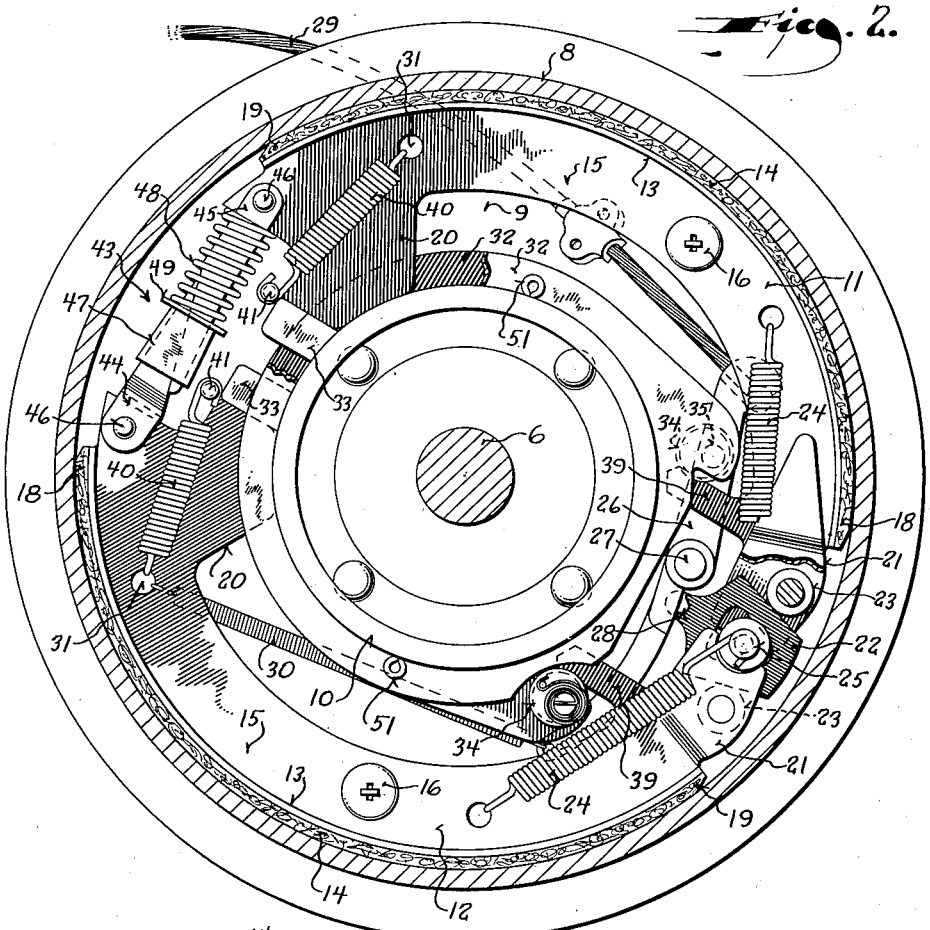
Figure 2 is a view similar to Figure 1, but illustrating the parts in their positions at the time the brake is applied, said view having portions thereof broken away to more clearly illustrate details of construction.
Figure 5:
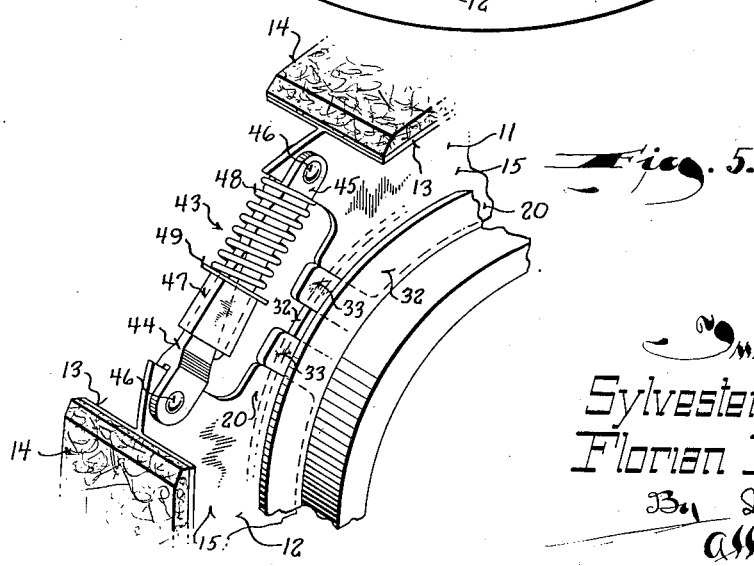
Figure 5 is a perspective view showing the mechanism by which proper positioning of the brake shoes is automatically effected.

Referring now particularly to the accompanying drawings in which like numerals indicate like parts throughout the several views, the numeral 5 designates the hub portion of the left front wheel of an automobile, journalled on a spindle 6 by bearings (not shown). The spindle 6 is carried by a yoke 7 by which the entire wheel is mounted on the front axle (not shown) for steering movement.

The hub portion 5, as is customary, is adapted to have a wheel (not shown) bolted thereto and is further provided with the customary brake drum 8.

Inside the brake drum is the brake mechanism. It is carried by a back plate 9 fixed to the yoke 7, and part thereof, as will be later described, is mounted on a large cylindrical bearing 10 fixed to the back plate coaxially with the spindle 6.

The brake mechanism comprises two brake shoes, a primary shoe 11 and a secondary shoe 12. Both of these shoes are of conventional construction and have an arcuate outer flange 13 to which the brake lining 14 is attached, generally by rivets, and a flat radial web 15 extending inwardly from the arcuate flange 14.

These shoes are loosely held in position inside the brake drum by spring retainers 16, which are anchored to the back plate 9 and yieldingly draw the shoes against the outer face thereof, the back plate having outwardly directed projections 17 at spaced intervals with which the inner edges of the brake abut.

Each brake shoe has a toe portion 18 and a heel portion 19, and the heel portion of the primary shoe and the toe portion of the secondary shoe have inward projections 20 adapted to engage the outer cylindrical surface of the bearing 10.

The toe portion of the primary shoe and the heel portion of the secondary shoe have extensions 21 directed toward each other. These extensions are alike and each is composed of spaced apart plates between which a wedge-like expander 22 is positioned.

The sides of this expander engage rollers 23 also mounted in the space between the plates forming the extensions 21.

Hence, by an outward radial motion of the wedge-like expander 22, the adjacent ends of the brake shoes are spread apart. Such outward spreading of these ends of the brake shoes is yieldingly resisted by tension springs 24, each having one end hooked onto one brake shoe and its opposite end engaged with a pin 25 which is anchored to the back plate 9, notches in the ends of the brake shoe extensions and an opening in the expander accommodating the pin 25.

Outward radial motion is imparted to the expander to positively expand the brake shoes, by means of a lever 26 pivoted as at 27 on a stud carried by the back plate, and engaging the expander through a swivel connection 28. One end of this lever has a cable 29 attached to it which passes through an appropriate hole in the back plate and leads to the pedal actuated mechanism so that depression of the pedal applies a pull on the cable in the customary manner.

The lever and the cable are returned to their normal positions by a spring 30, one end of which engages the end of the lever opposite its connection with the cable and the other end of which is hooked into a hole 31 in the web 15 of the secondary shoe.

Obviously, the mechanical means described for actuating the expander may be supplanted by a hydraulic mechanism without deviating from the invention.

To the extent thus far described, the brake mechanism is more or less conventional for through the action of the positive expander 22, the toe portion 18 of the primary shoe and the heel portion 19 of the secondary shoe are pushed out into contact with the revolving brake drum. The primary shoe would then act with a wrapping effect, but the secondary shoe would merely drag and be more or less ineffective.

With this invention, however, actuation of the expander 22 not only engages the toe portion of the primary and the heel portion of the secondary shoe with the drum, but also pushes out the toe portion of the secondary shoe, which is important, and the heel portion of the primary shoe. Consequently, the entire braking surface is applied to the drum at the same time and both shoes have a wrapping action.

This is brought about by the provision of two motion transmitting rings 32 mounted for rotation on the bearing 10, one to apply an outward pressure on the toe portion of the secondary shoe and the other to apply an outward pressure on the heel portion of the primary shoe.

The two motion transmitting rings are identical, and each has a lug 33 welded to one side thereof for engagement with the portion 20 of the shoes, and a disc 34 eccentrically mounted on the ring by a stud 35. A torsion spring 36, having one end anchored to the stud and its other end hooked about a pin 37 on the disc, yieldingly tends to turn the disc in one direction, for a purpose to be hereinafter described. Preferably, although not necessarily, the disc is spool-shaped with flanges 38 on its opposite sides.

The peripheries of the discs 34 engage actuator arms 39 formed as integral parts of the webs 15 of both shoes and the relationship of these parts is such that the torsion springs 36 at all times urge their long radii portions toward the actuator arms 39 to take up play between the parts, in a manner to be hereinafter more fully described.

The rings 32 are applied to the bearings 10 in reversed order. That is, one ring which is positioned between the plane of the webs 15 of the brake shoes and the back plate 9 is applied with its lug and eccentric disc facing outwardly to be in line with the plane of the webs 15; whereas the other ring is applied in the opposite manner with its lug and eccentric disc facing inwardly. It will thus be seen that upon expansion of the brake shoes by the expander 25, rotation will be simultaneously imparted to both of the rings 32 in opposite directions, whereby the opposite ends of the shoes will likewise be expanded or spread apart through the movement apart of the lugs 33.

Expansion of these latter ends of the shoes is yieldingly opposed by tension springs 40, each having one end hooked into the hole 31 of each brake shoe and its opposite end engaged over a fixed pin 41 carried by the back plate. These springs, like the springs 24, return the shoes to their inactive positions upon release of the brake actuating pedal (not shown).

The springs 40, as stated, yieldingly draw the heel of the primary shoe and the toe of the secondary shoe together. The extent to which these portions of the shoes are drawn together is limited by an automatically adjustable spacer 43.

This spacer comprises a pair of complementary wedge members 44 and 45, the outer ends of which are bifurcated to embrace the adjacent end portions of the brake shoe webs to which they are attached by pins 46. The side edges of the members 44 and 45 are inclined, and the adjacent edges of the two members are in engagement so that by movement apart the width across the engaging portions of the wedge members is reduced, and by movement together, it is increased.

These engaging portions of the wedge members are embraced by a collar or band 47, the edge walls of which are tapered with the narrow width facing the wedge member 45. The composite width of the engaging portions of the wedge members is correspondingly tapered so that by forcing the collar or sleeve 47 toward the wedge member 44, the wedge members can be releasably locked in different relative positions.

To maintain the sleeve or collar in its operative position, a compression spring 48 encircles the wedge member 45 between the edge of the brake shoe with which the wedge member 45 is connected and the adjacent narrow end of the collar or band 47, a washer 49 being placed between the spring and the band to provide a seat for the spring.

The connections between the bifurcated ends of the wedge members and the brake shoes have a degree of play or clearance by virtue of the fact that the holes 50 in the webs of the brake shoes through which the pins 46 pass are slightly larger than the pins. This relationship is illustrated in exaggerated form in Figures 6 and 7.

It is this clearance or play between the pins and the holes in the brake shoe webs which automatically maintains the proper clearance between the brake linings and the brake drum.

The manner in which it is accomplished can be best understood from reference to Figures 6 and 7, the former of which shows the parts in the positions they occupy when the brake is disengaged, and the latter shows the parts in the positions they occupy when the brake is engaged.

As illustrated in these views, when the brake is released and the springs 40 are free to draw the brake shoes together, the pins engage the outermost edges of the holes 50 with reference to a line drawn through and connecting the axes of the pins, and when the brake is engaged, that is, the shoes are expanded or spread apart, then the pins engage the inner edge portions of the holes 50, or at least approach the same.

The effective length of the spacer remains unchanged until the brake linings wear and it is necessary to spread the shoes farther apart to effect proper engagement of the brake.

In that event, the effective length of the spacer will be increased by the engagement of the inner edges of the holes 50 with the pins 46 and the relative outward motion of the brake shoes. When the brake is released after automatic adjustment of the length of the spacer, the spacer length remains as readjusted where it is held by the locking action of the wedges and the collar or band 47, and the brake shoes come together an extent sufficient to engage the pins 46 with the inner edges of the holes 50.

In this new position of adjustment, the brake shoes are, of course, farther apart than they were initially, but the important result is that the clearance between the brake lining and the surface of the drum at all times remains constant, being determined solely by the extent of play which the pins 46 have in the holes 50.

Contact is always maintained between the lugs 33 and the edges of the brake drum webs which they engage by the automatic take-up comprising the eccentric discs 34. As stated, when the brake is released, the shoes are drawn together by the springs 40 and 24, carrying the lugs 33 with them and revolving the rings 32 as required.

In the event of readjustment of the spacing between the brake shoes, in the manner described, which means that the lugs 33 will not be carried back to their initial positions, play would result between the actuator arms 39 and the discs 34, except for the torsion springs 36, which, as previously stated, constantly tend to turn the discs 34 in a direction to swing their large radii portions toward the arms 39. Thus, through the medium of the eccentrically mounted discs 34 and their torsion springs 36, play is automatically taken up between the parts by which the ends of the shoes opposite the expander are actuated.

The flanges 38 on the eccentrically mounted discs engage over the side edges of the actuator arms 39 and thus hold the discs against lateral displacement with respect to the arms 39. Lateral displacement of the lugs 33 with respect to the web portions 20 which they engage is precluded by having the rings 32 engage opposite sides of the web portions 20 where they are held by suitable abutments carried by the bearing 10, such as cotter pins 51 passing through the wall of the bearing 10 in front of the foremost disc 32 and projections 52 struck from the back plate 9.

From the foregoing description taken in connection with the accompanying drawings, it will be readily apparent that this invention provides a very material improvement over past brake constructions, and that it assures uniform wear of the lining and entirely obviates the need for adjustment.

It will also be apparent that the conventional and accepted design for internal expansion brakes has been retained substantially in its entirety, and that the improvements and advantages of this invention are obtained with but few changes in this accepted design so that the cost of manufacture is not seriously increased.

What we claim as our invention is:

1. In a brake of the character described: a rotatable brake drum; a pair of brake shoes inside the drum and having braking surfaces engageable with the inner face of the drum; means loosely holding said brake shoes in position and permitting movement thereof toward and from each other; means for yieldingly drawing the brake shoes toward each other; means for positively moving the brake shoes away from each other at one end; means operable by motion of said ends of the brake shoes away from each other for effecting a corresponding movement apart between the opposite ends of the brake shoes; and an automatically adjustable spacer for limiting movement of the brake shoes toward each other to at all times maintain a predetermined clearance between the braking surfaces of the shoes and drums, said adjustable spacer comprising two complementary members, and a connection therebetween allowing movement of said members apart but preventing movement thereof toward each other.

2. In a brake of the character described: a rotatable brake drum; a pair of diametrically opposed brake shoes inside the drum having surfaces adapted for engagement with the drum; a central bearing inside the brake shoes coaxial with the drum; means for spreading the brake shoes at one pair of their adjacent ends; a pair of rings rotatable about said bearing; an abutment on each ring engageable with the opposite end of one brake shoe; a connection between each ring and the first named end of the shoe other than the one engaged by its respective abutment, whereby said rings are rotated in opposite directions by the spreading of the first named ends of the shoes to simultaneously spread the opposite ends of the shoes; means incorporated in said last named connection for automatically taking up play between the rings and the brake shoes; means for yieldingly drawing the second named ends of the shoes together; and an automatically adjustable spacer for limiting the extent to which said second named ends of the shoes are drawn together.

3. In a brake of the character described: a rotatable brake drum; a pair of diametrically opposed brake shoes inside the drum having surfaces adapted for engagement with the drum;

a central bearing inside the brake shoes coaxial with the drum; means for spreading the brake shoes at one pair of their adjacent ends; a pair of rings rotatable about said bearing; an abutment on each ring engageable with the opposite end of one brake shoe; a connection between each ring and the first named end of the shoe other than the one engaged by its respective abutment, whereby said rings are rotated in opposite directions by the spreading of the first named ends of the shoes to simultaneously spread the opposite ends of the shoes; means for yieldingly drawing the second named ends of the shoes together; an automatically adjustable spacer for limiting the extent to which said second named ends of the shoes are drawn together; said automatic spacer comprising, complementary wedge members connected with the brake shoes, and automatically adjustable means for locking the wedge members against relative motion.

4. In a brake: a rotatable brake drum; a pair of diametrically opposed brake shoes inside the drum and having surfaces adapted for engagement with the drum; positively acting means between one pair of adjacent ends of the brake shoes for spreading the same apart; a motion transmitting connection between said end of each of said brake shoes and the opposite end of the other of said brake shoes, whereby movement apart of said first designated ends of the brake shoes causes similar movement apart of the opposite ends of the brake shoes; and means for automatically taking up wear and play in said motion transmitting connections.

5. In a brake: a rotatable brake drum; a pair of diametrically opposed brake shoes inside the drum and having surfaces adapted for engagement with the drum; positively acting means between one pair of adjacent ends of the brake shoes for spreading the same apart; a motion transmitting connection between said end of each of said brake shoes and the opposite end of the other of said brake shoes, whereby movement apart of said first designated ends of the brake shoes causes similar movement apart of the opposite ends of the brake shoes; and means for automatically taking up wear and play in said motion transmitting connections, said last named means comprising, a part eccentrically mounted and engageable with an abutment on the adjacent portion of the brake shoe, and means yieldingly urging said part in a direction to position its portion having the longest radius toward said abutment.

6. In a brake of the character described: two diametrically opposed brake shoes; means for positively moving one pair of adjacent ends of the brake shoes away from each other; two rotatable elements, each having an abutment engaging the opposite end of one of said brake shoes so that opposite rotation of said elements in directions to move their abutments away from each other spreads said opposite ends of the brake shoes; driving connections between said rotatable elements and the first designated ends of the brake shoes through which a spreading action at said first designated ends of the brake shoes effects such rotation of the rotatable elements; and means incorporated in said driving connection for automatically taking up play between the rotatable elements and the brake shoes.

7. In a brake of the character described: two diametrically opposed brake shoes; means for positively moving one pair of adjacent ends of the brake shoes away from each other; two rotatable elements, each having an abutment engaging the opposite end of one of said brake shoes so that opposite rotation of said elements in directions to move their abutments away from each other spreads said opposite ends of the brake shoes; and driving connections between said rotatable elements and the first designated ends of the brake shoes through which a spreading action at said first designated ends of the brake shoes effects such rotation of the rotatable elements, each of said driving connections comprising, an abutment fixed with respect to the brake shoe, an eccentrically mounted member carried by the rotatable element engaging the abutment, and spring means yieldingly urging said eccentrically mounted member in a direction to at all times urge its portion of greatest radius towards the abutment.

8. In a brake of the character described: two brake shoes mounted for movement toward and from each other; means yieldingly drawing the brake shoes toward each other; spacing means for limiting the movement of the shoes toward each other and automatically varying the extent to which they approach each other in accordance with wear on their braking surfaces comprising, complementary wedge members, one connected to each of said brake shoes with a loose connection; and a releasable locking connection for holding the complementary wedge members against relative motion, whereby the extent of play in the loose connections between the wedge members and the shoes determines the extent to which they approach each other, said releasable means being releasable upon movement of the wedge members apart.

9. In a brake of the character described: a rotatable brake drum; two brake shoes inside the drum having surfaces adapted for engagement with the drum; means for yieldingly drawing the brake shoes toward each other and away from the brake drum; a spacer to limit the extent to which the shoes approach each other and thus determine the clearance between the brake shoes and the drum, said spacer comprising, complementary wedge members loosely connected with the brake shoes; and means for releasably securing said wedge members against relative motion, whereby the extent of play in their loose connections with the brake shoes limits the relative motion of the brake shoes toward and from each other, and said locking means being releasable by movement of the wedge members apart to increase the effective length of the spacer as the braking surfaces of the shoes wear.

10. In a brake of the character described: a brake drum; two brake shoes mounted in the drum for movement toward each other and from each other into engagement with the brake drum; means yieldingly drawing the brake shoes toward each other and away from the brake drum; an automatically adjustable spacer connecting the brake shoes for limiting movement thereof toward each other and automatically varying the extent to which they approach each other in accordance with wear on their braking surfaces, said spacer comprising complementary wedge members having surfaces in sliding engagement; a lost motion connection between each wedge member and one brake shoe; a single collar encircling said wedge members, said collar and the portions of the wedge members received therein being tapered so that the wedge members can be locked against movement toward each other at different relative positions; and means yieldingly urging said collar to its operative position locking the wedge members against such relative motion, whereby movement apart of the brake shoes during application of the brake in excess of the amount permitted by the lost motion connection between said wedge members and the brake shoes effects adjustment of said spacer.

11. In a brake of the character described: two brake shoes; a connection between said brake shoes through which motion may be transmitted from one to the other, said connection including an abutment on one brake shoe, and a part connected with the other brake shoe and bearing against said abutment; and means for taking up play in said connection comprising an element eccentrically rotatable on said part and interposed between said part and the abutment, and a spring yieldingly urging said eccentrically rotatable element in the direction tending at all times to interpose its portion of greatest radial dimension between said part and said abutment.

SYLVESTER F. KARST.
FLORIAN F. MANOR.